(12) United States Patent  
Weggel (10) Patent No.: US 7,965,795 B2
(45) Date of Patent: Jun. 21, 2011

(54) PREVENTION OF INTEGRATOR WIND-UP IN PI TYPE CONTROLLERS

(75) Inventor: Craig R. Weggel, Willow Grove, PA (US)

(73) Assignee: Performance Controls, Inc., Montgomeryville, PA (US)

( * ) Notice: Subject to any disclaimer, the term of this patent is extended or adjusted under 35 U.S.C. 154(b) by 1546 days.

(21) Appl. No.: 11/286,695

(22) Filed: Nov. 23, 2005

(65) Prior Publication Data

US 2006/0190100 A1 Aug. 24, 2006

Related U.S. Application Data (60) Provisional application No. 60/630,933, filed on Nov. 24, 2004.

(51) Int. Cl.
*H04L 25/06* (2006.01)
*H04L 25/10* (2006.01)

(52) U.S. Cl. ........ 375/318; 318/560; 318/561; 318/610; 318/616; 318/618

(58) Field of Classification Search .................. 375/318; 318/400.32, 433, 560, 10, 561, 4, 616, 618, 318/610
See application file for complete search history.

(56) References Cited

U.S. PATENT DOCUMENTS

| 4,727,303 | A | 2/1988 | Morse |
| 4,872,104 | A | 10/1989 | Holsinger |
| 5,384,526 | A | 1/1995 | Bennett |
| 5,818,178 | A * | 10/1998 | Marumoto et al. ...... 318/400.32 |
| 6,330,483 | B1 | 12/2001 | Dailey |
| 6,725,103 | B2 * | 4/2004 | Shigemasa et al. ............. 700/53 |

* cited by examiner

*Primary Examiner* — Ted M Wang
(74) *Attorney, Agent, or Firm* — Steven M. Koehler; Westman, Champlin & Kelly, P.A.

(57) ABSTRACT

A control system having an integrator component that provides an integrator output signal used to control a load, and a method controlling the same includes conditioning the integrator component during a fraction of the period in which it would tend to otherwise wind-up.

17 Claims, 8 Drawing Sheets

PI Controller with Alternate Integrator Wind-up Control Configuration

PIWC Control Loop block Diagram

PI Controller with Alternate Integrator Wind-up Control Configuration

FIG. 8

PID Controller with Alternate Integrator Wind-up Control

PREVENTION OF INTEGRATOR WIND-UP IN PI TYPE CONTROLLERS

CROSS-REFERENCE TO RELATED APPLICATION

The present application is based on and claims the benefit of U.S. provisional patent application Ser. No. 60/630,933, filed Nov. 24, 2004, the content of which is hereby incorporated by reference in its entirety.

BACKGROUND OF THE INVENTION

The discussion below is merely provided for general background information and is not intended to be used as an aid in determining the scope of the claimed subject matter.

Controllers having proportional gain and integral gain components in a control loop structure are well known. Variations of these controllers can include a differential gain component as well. However, a controller using a proportional and integral (PI) control loop structure can exhibit excessive output overshoot resulting from "integrator wind-up."

Figure 1:
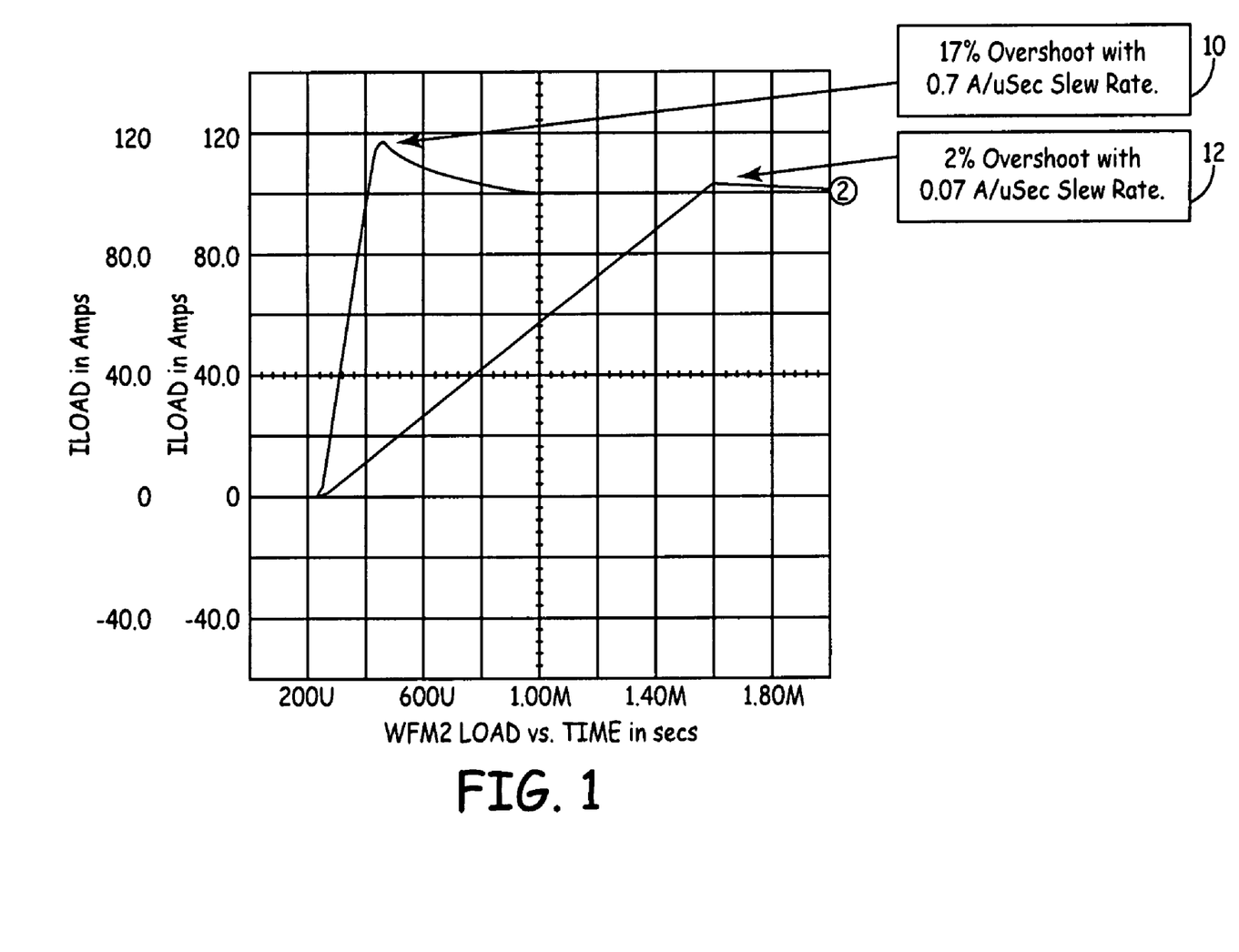
FIG. 1 illustrates plots of output signals exhibiting transient overshoot in response to command signals having different slew rates.

By way of example only, a power amplifier can include a PI type controller and can provide power to an electrical load. In the case of an inductive load, again by example, voltage is applied across the inductor for a time proportional to the inductance and inversely proportional to the applied voltage. During this time, a system error (desired value versus actual value) can exist, resulting in an erroneously high integrator value. The integrator value achieves a level in excess of a level required to maintain steady-state output current. The result is transient current overshoot as illustrated in FIG. 1. FIG. 1 illustrates, for example, a 17% overshoot at 10 in response to a first command signal slew rate, while a second overshoot of 2% is indicated at 12 for a corresponding command signal having a slower slew.

Figure 2:
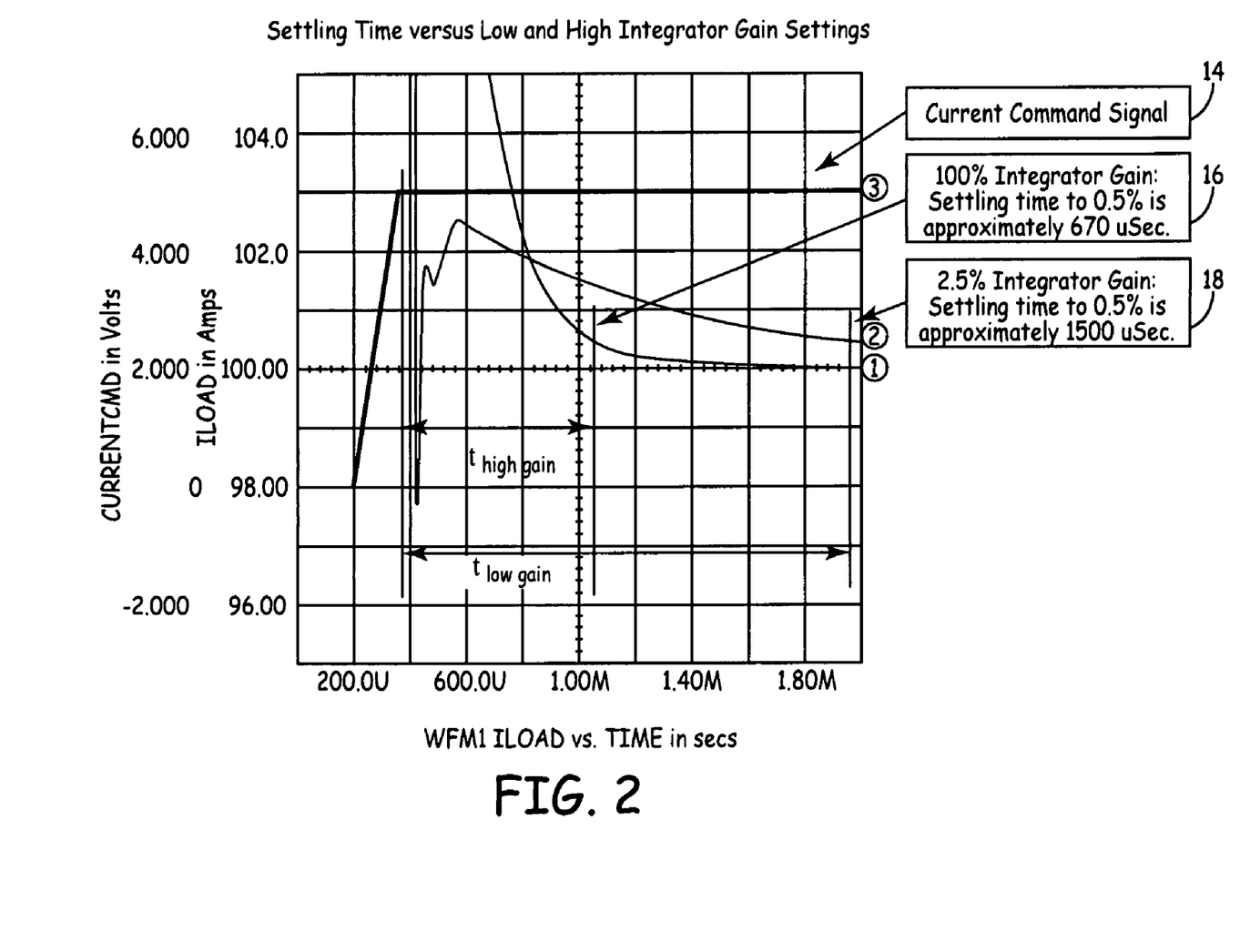
FIG. 2 illustrates plots of output signals having different settling times based on integrator gain settings.

Typically, in order to minimize overshoot, it is known to reduce the integrator value of the integrator component and/or increase the proportional value of the proportional component. Although this technique reduces overshoot, it has the disadvantage of increasing settling time, which is the time that the controller needs to obtain the desired steady state value. In FIG. 2, a command signal is indicated at 14, wherein a first output signal corresponding to a higher integrator gain value is indicated at 16, while a second output signal 18 for a lower integrator value is also illustrated. As can be seen in FIG. 2, the overshoot or the second or lower of the second output signal 18 having the lower integrator gain value is less than the overshoot of the first output signal; however, the settling time, $T_{low\ gain}$ for the lower integrator gain value is substantially longer than the settling time, $T_{high\ gain}$ for the high gain value.

SUMMARY OF THE INVENTION

This Summary and the Abstract are provided to introduce some concepts in a simplified form that are further described below in the Detailed Description. This Summary is not intended to identify key features or essential features of the claimed subject matter, nor is it intended to be used as an aid in determining the scope of the claimed subject matter. In addition, the description herein provided and the claimed subject matter should not be interpreted as being directed to addressing any of the short-comings discussed in the Background.

A control system having an integrator component that provides an integrator output signal used to control a load, and a method controlling the same. The method includes conditioning the integrator component during a fraction of the period in which it would tend to otherwise wind-up. In one embodiment, the control system includes a component adapted to reverse-charge the integrator component to a value less than the value required to maintain a steady-state level desired for the load. In particular, the component can be a differentiator component adapted to provide a differentiator output signal used by the integrator component, where the differentiator component is adapted to receive one of an input signal based on a command signal or a feedback signal.

Likewise, the step of conditioning in the method of controlling the load can include reverse-charging the integrator component to a value less than the value required to maintain a steady-state level desired for the load. In one embodiment, reverse-charging the integrator component can include receiving one of an input signal based on a command signal or a feedback signal; differentiating said input signal; combining said input signal with a signal based on the command signal; and providing the combined input signal and the signal based on the command signal to the integrator component.

DETAILED DESCRIPTION OF THE ILLUSTRATIVE EMBODIMENTS

An aspect of the present invention relates to a controller or a control loop structure thereof intended to minimize system response overshoot without the adverse effect of increased settling time. This aspect of the invention can be implemented in any type of application. In the discussion below, application to an electronic amplifier will be made; however, an application to this type of system should not be considered limiting.

Figure 3:
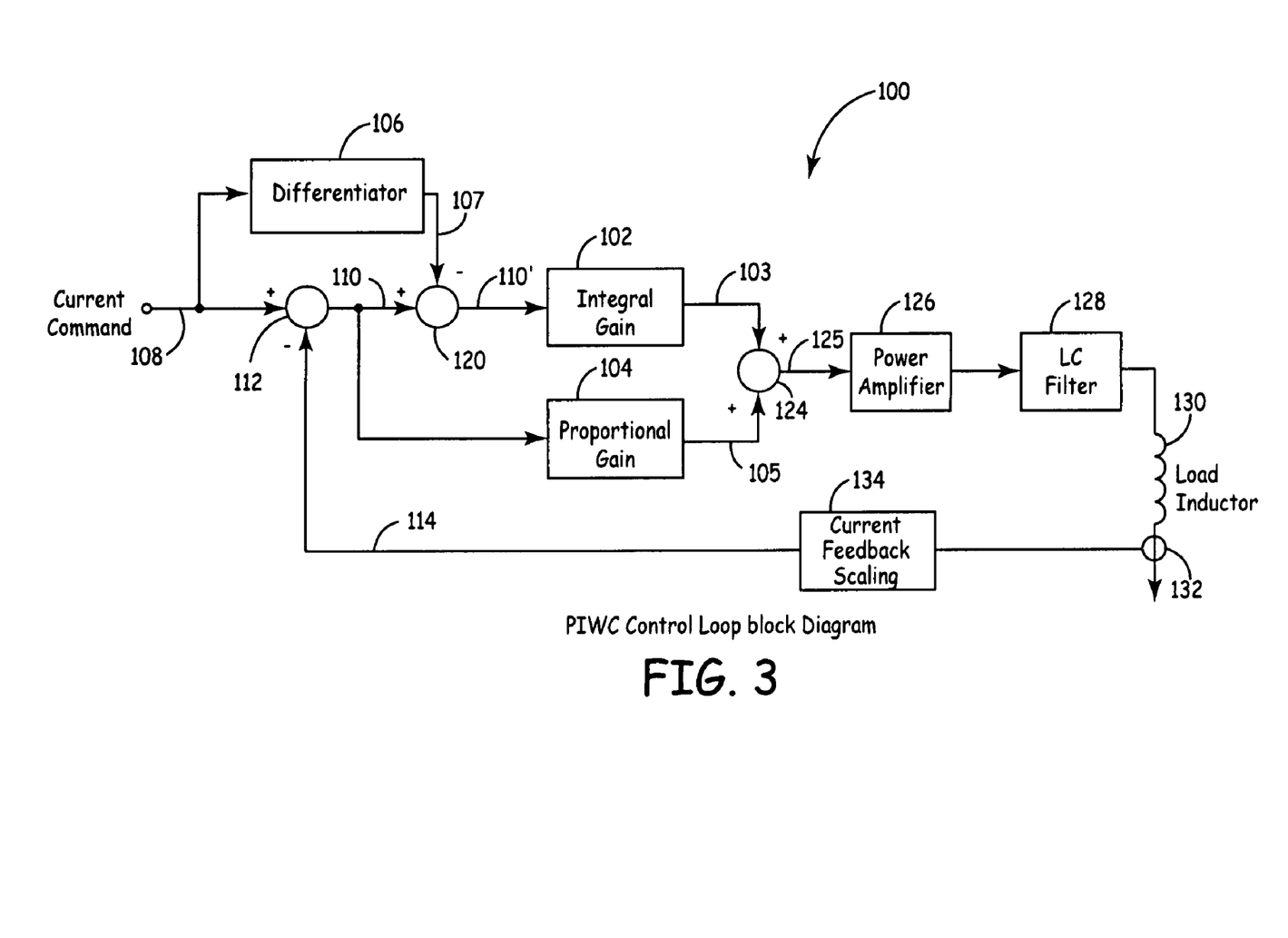
FIG. 3 is a block diagram of a first controller.

Referring to FIG. 3, a PI-type controller 100, herein having only an integral gain component 102 and a proportional component 104, includes a differentiator component 106 to control integrator wind-up. Generally, the control loop structure of controller 100 is similar to the classical PI control loop with the exception of the additional circuit, the differentiator 106. In operation, the command signal 108 is differentiated by the differentiator 106 and provided to the integrator circuit 102 as modified system error 110, with a phase relationship such that it forces the integrator signal in a direction opposite to that of its natural response to a system error 110. In other words, the integrator component 102 is conditioned or "unwound" by its input signal during a fraction of the period in which it would tend to otherwise wind-up. With a proper gain setting (e.g. fixed), this action by the integrator component 102 ensures that the integrator component 102 will not contribute to overshoot. Instead, the integrator component 102 will delay the system response arrival to its final set point. The gain of the control loop can be optimally adjusted to produce a nearly ideal system response.

A classical PI-type controller includes a summer 112 receiving the command or desired signal 108 and a feedback signal 114 (based on the actual response) in order to generate the system error signal 110. In the controller 100 herein illustrated, the system error signal 110 is provided to the proportional gain element 104, but is not directly provided to the integral gain component 102 as in the case of a classical PI-type controller. Rather signal 110 is provided to a summer 120. As indicated above, summer 120 combines the system error signal 110 with the output of the differentiator component 106 that has conditioned or filtered the command signal 108 in order to generate the modified system error signal 110'. The outputs of the integral gain component 102 and the proportional gain component 104 are combined by summer 124 that in turn is provided to components of the application to which the controller 100 is directed herein exemplified and simplified as an electronic power amplifier having a power amplifier 126, and inductor/capacitor (LC) output filter 128 that provides power to a load 130. From this exemplary application, a current sensor 132 provides a feedback signal, the gain of which is adjusted by current feedback scaling circuit 134. The schematic block diagram of FIG. 3 illustrates components of controller 100 in addition to the controlled device (i.e. power amplifier 126, LC filter 128 and load 130). As appreciated by those skilled in the art, the controller components can be implemented in hardware modules (digital and/or analog) and/or software modules.

Figure 4:
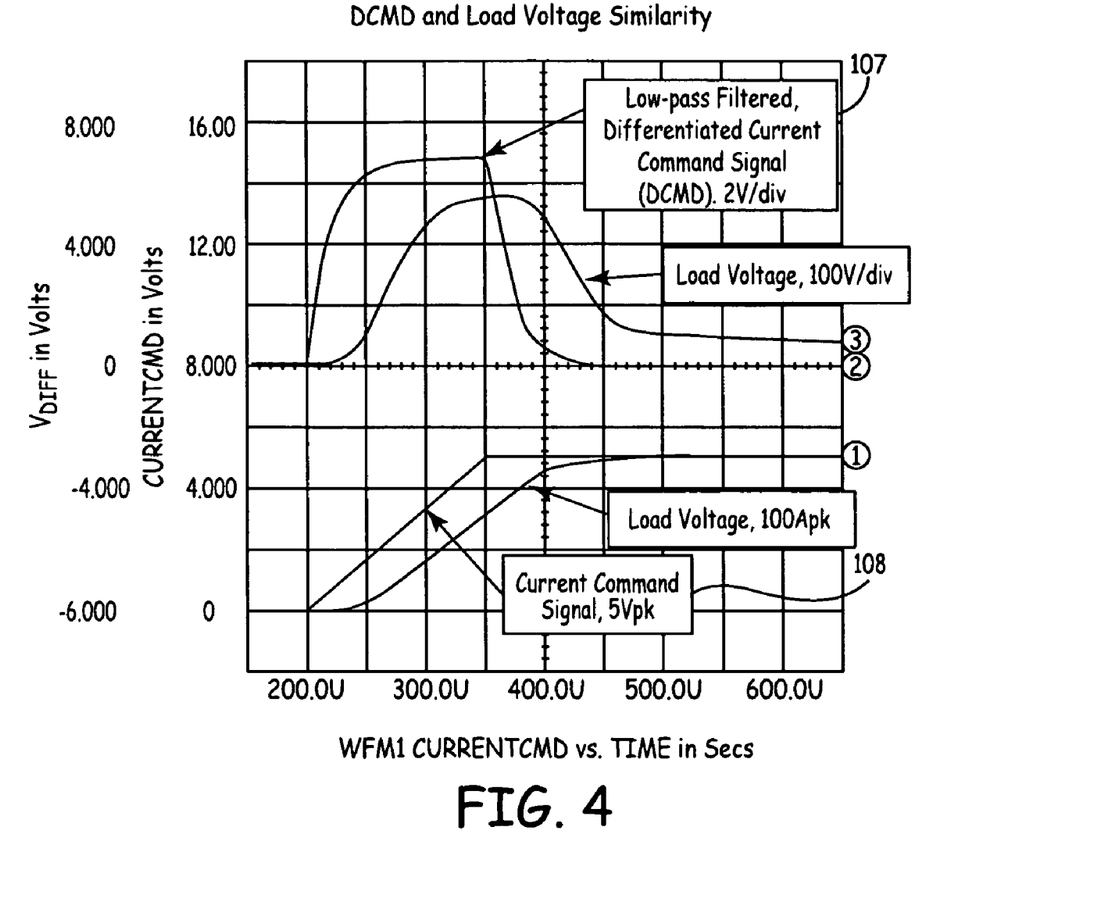
FIG. 4 illustrates plots of a differential command signal in relation to load voltage, load current and command signals.

The differentiator component 106 applies a differentiating function to the command signal 108, producing a signal 107 ("DCMD" or "differentiated command") proportional to the rate of change of the command signal 108. Signal 107 is used to "reverse-charge" the integrator component 102. Since the area under the DCMD signal 107 is approximately proportional to the area under the voltage signal required to slew current in load 130, the DCMD signal 107 can be used to reverse-charge the integrator component 102 to the appropriate level given various command slew rates and amplitudes. FIG. 4 illustrates an exemplary DCMD signal 107 in relation to load voltage, load current, and the command signal 108.

Figure 5:
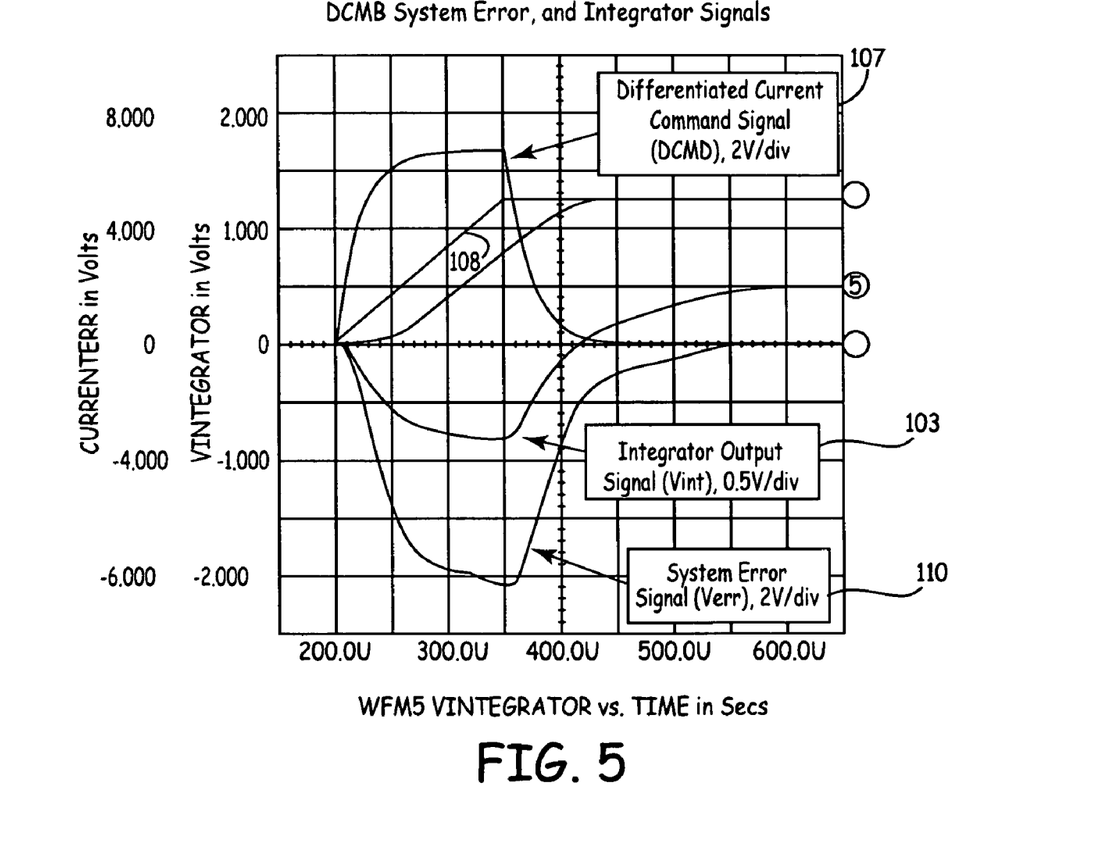
FIG. 5 illustrates plots of differential command, system error and integrator signals.

The DCMD signal 107 and the system error (Verr) signal 110 are summed together by summer 120. An output signal 103 of the integrator component 102 is a result of integrating the modified system error signal 110'. FIG. 5 illustrates an exemplary output signal 103 in relation to system error signal 110, DCMD signal 107, the command signal 108 and load current.

Figure 6:
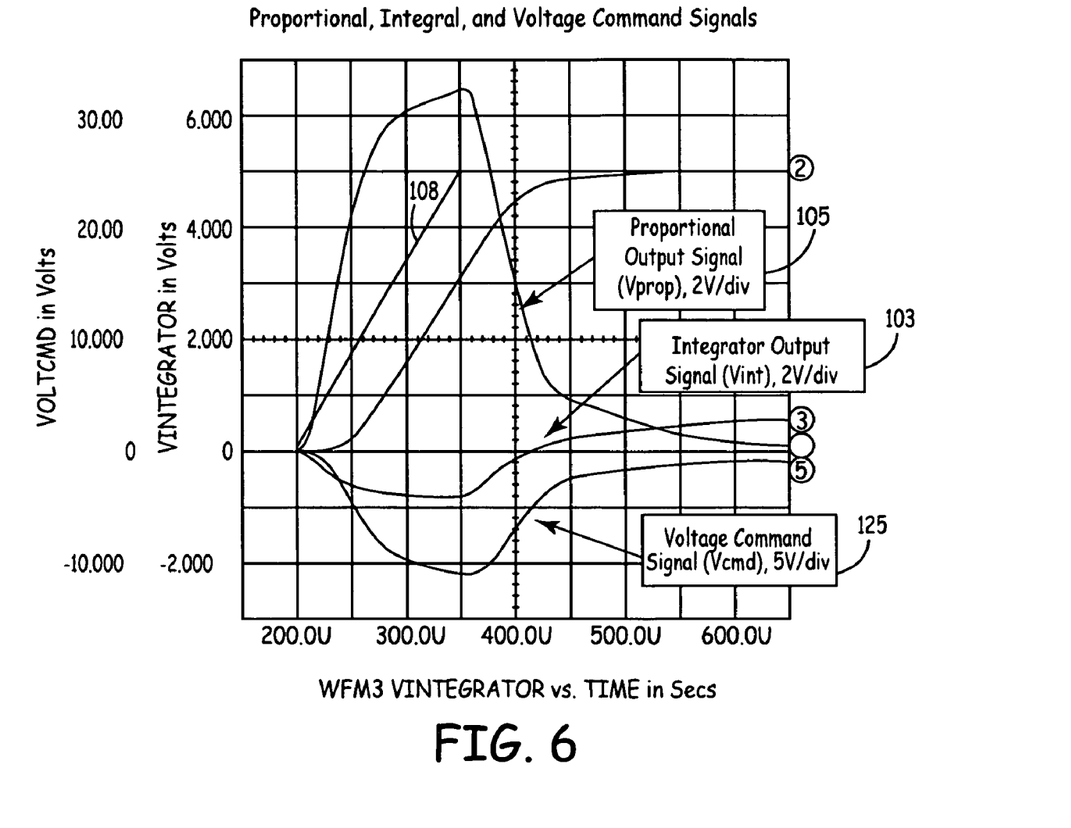
FIG. 6 illustrates plots of proportional, integral and voltage command signals.

Summer 124 sums signal 103 with the output 105 from the proportional gain component 104 to generate a voltage command signal, or final command signal 125, which is used to control the power amplifier 126. FIG. 6 provides an exemplary illustration of command signal 125, integrator output signal 103, proportional output signal 105 and command signal 108.

By reverse-charging the integrator component 102 to a value less than the value required to maintain the steady-state level desired for the load 130, during slew, the integrator component 102 is forced to a value less than the desired steady-state value, thus eliminating output overshoot or making it less severe as it might otherwise be resulting from dynamic variations in the load. For instance, by controlling current provided to an electrical inductive load 130, variations in load impedance, such as the change in the AC load resistance resulting from magnetically induced eddy currents, are minimized. Eddy current activity on the load is a dynamic system behavior that can affect the system error differently with different load current slew rates and amplitudes.

Once the output waveform nears steady-state, the DCMD signal 107 approaches 0 and allows the "post-dynamic" system error to drive the fast-responding (high gain) integrator component 102 to the proper value. It should be noted the DCMD signal 107 should be properly scaled to ensure that the integrator component 102 is forced to a value less than the required steady-state value to ensure 0 overshoot.

Without integrator wind-up compensation, an integrator component with high gain will respond to the dynamic system error and will obtain a value considerably higher than the value required for maintaining the steady-state condition. The integrator component will therefore need to "un-wind", a process that results in system error overshoot as discussed in the background section of the description.

A particular advantageous characteristic of the control system and method described herein is that unlike many prior art techniques where at least an element in the corresponding control system is required to go into saturation or approach saturation to activate control, the present technique is continuously active, i.e., no element in the control system is required to go into saturation or approach saturation in order to activate any "anti-windup" control. This can allow the control loop to have a higher integrator gain (quicker response) without causing overshoot. This "conditioning" of the integrator in one embodiment includes conditioning the input stimulus (output of the differentiator 106) to the integrator as described above. Stated another way the output of the differentiator 106 is a control signal that conditions the integrator 102. The control signal can be used to reverse-charge the integrator 102, or used to act upon the integrator 102 such as dynamically adjusting its gain or inhibiting or suppressing its operation for a selected time.

Figure 7:
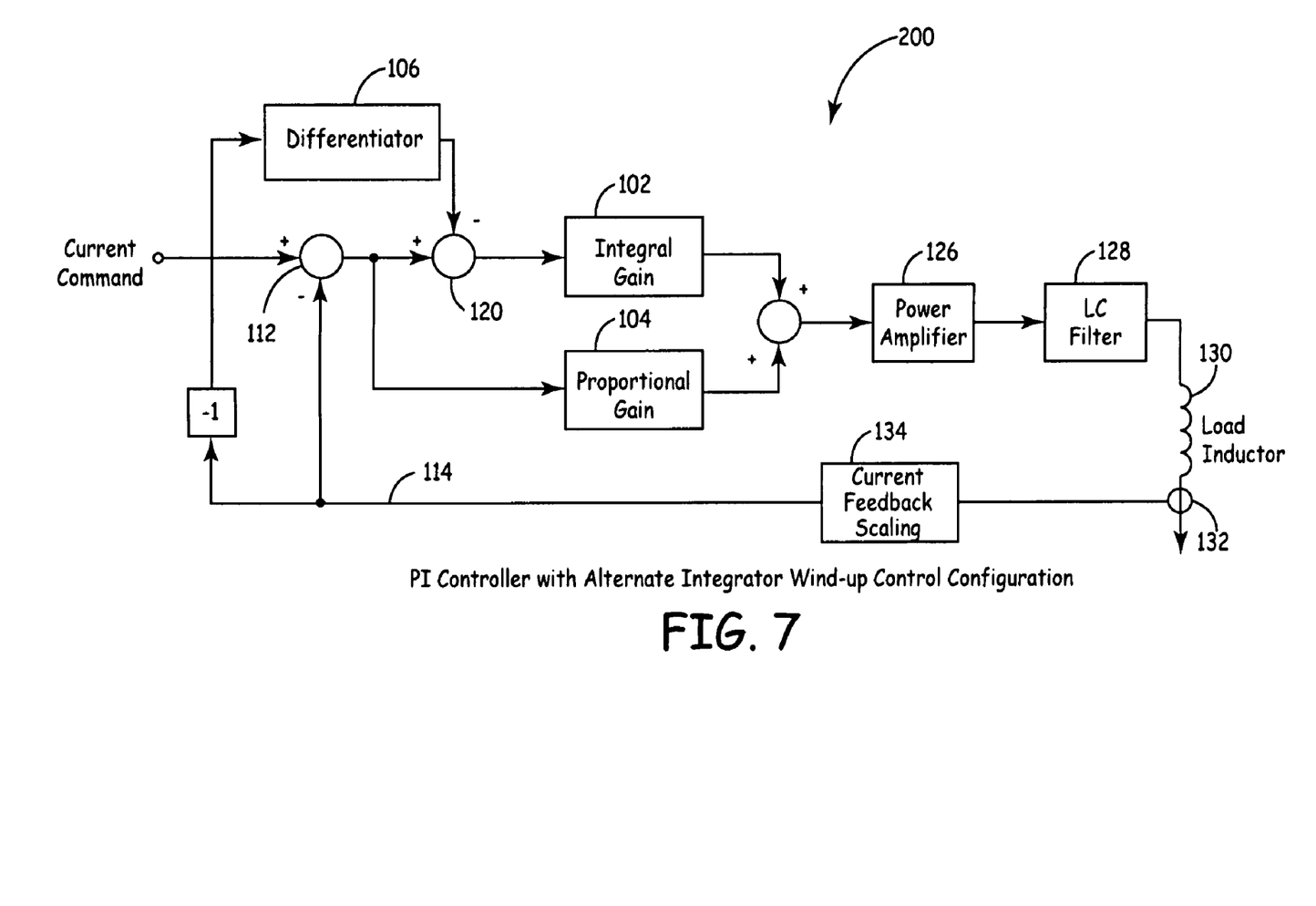
FIG. 7 is a block diagram of a second controller.

In an alternative configuration illustrated in FIG. 7, the differentiator component 106 receives a signal based on the feedback signal 114, wherein the controller 200 operates in a manner similar to that described above. The controller of FIG. 7 is useful for large disturbances attributable to the load 130 as opposed to the controller of FIG. 3, which is useful for large disturbances of a command signal 108. As appreciated by those skilled in the art, a combination of FIGS. 3 and 7 can also be implemented.

Figure 8:
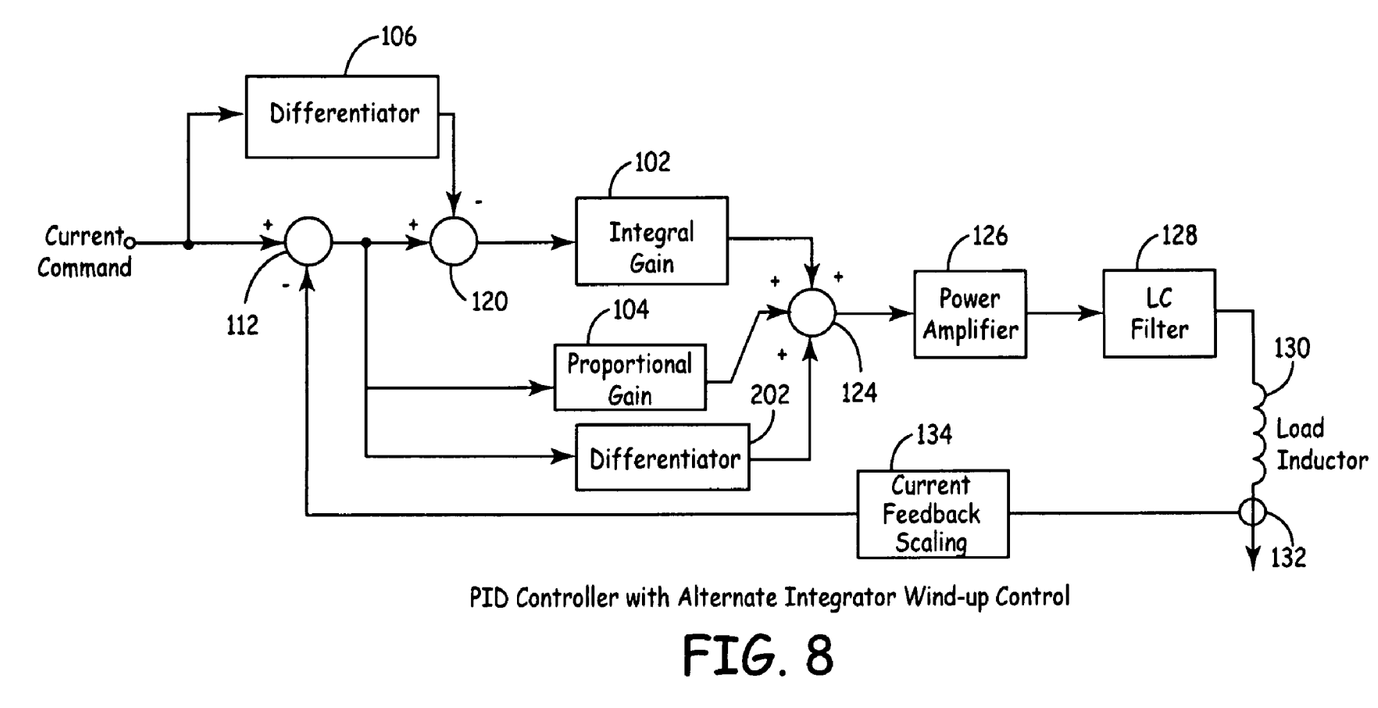
FIG. 8 is a block diagram of a third controller.

FIG. 8 illustrates application of differentiator 106 to a PID controller having differential gain component 202 as is known in the art. Likewise, PID controller can also be implemented in FIG. 7.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:
1. A control system for controlling a load, the controller comprising:
   a first summer adapted to receive a command signal and a feedback signal, the first summer adapted to generate a system error signal based upon the command signal and the feedback signal;
   a proportional gain component adapted to receive the system error signal, the proportional gain component adapted to generate a proportional gain output based upon the system error signal;

a differentiator component adapted to receive one of an input signal based on the command signal or the feedback signal, the differentiator component adapted to generate a differentiated signal based upon the one of the input signal;

a second summer adapted to receive the differentiated signal and the system error signal, the second summer adapted to generate a modified system error signal based upon the differentiated signal and the system error signal;

an integral gain component adapted to receive the modified system error signal, the integral gain component adapted to generate an integrating output signal based upon the modified system error signal; and a third summer adapted to receive the proportional gain output and the integrating output signal, the third summer adapted to generate a second command signal, the second command signal being utilized to control the load and being based at least in part upon the proportional gain output and the integrating output signal.

2. The control system of claim 1 and further comprising:

a differentiator gain component adapted to receive the system error signal, the differentiator gain component adapted to generate a differentiator output signal based upon the system error signal; and wherein the third summer is further adapted to receive the differentiator output signal and to generate the second command signal based at least in part upon the differentiator output signal.

3. The control system of claim 1 wherein the differentiated signal is proportional to a rate of change of the one of the input signal.

4. The control system of claim 1 wherein the differentiated signal is scaled.

5. The control system of claim 1 wherein the one of the input signal is based on the command signal.

6. The control system of claim 1 wherein the one of the input signal is based on the feedback signal.

7. The control system of claim 1 wherein the integrating output signal is a result of integrating the modified system error signal.

8. A control system for controlling a load, the control system comprising:

a feedback circuit adapted to provide a feedback signal based on operation of the load;

a first summer adapted to receive a command signal and the feedback signal and generate a system error signal;

a differentiator component adapted to provide a differentiated signal, the differentiator component adapted to receive one of an input signal based on the command signal or the feedback signal;

a second summer adapted to receive the system error signal and the differentiated signal and generate a modified system error signal;

an integral gain component adapted to receive the modified system error signal and provide an integrating output signal used to control the load; and a proportional gain component adapted to receive the system error signal and to provide a proportional gain output signal used to control the load.

9. The control system of claim 8 wherein the one of the input signal is based on the command signal.

10. The control system of claim 8 and further comprising:

a differentiator gain component adapted to receive the system error signal and to provide a differentiator output signal used to control the load.

11. The control system of claim 10 and further comprising:

a third summer adapted to receive the integrator output signal, the proportional output signal, and the differentiator output signal, the third summer combining the integrator output signal, the proportional output signal, and the differentiator output signal to generate a signal for controlling the load.

12. The control system of claim 8 and further comprising:

a third summer adapted to receive the integrator output signal and the proportional output signal, the third summer combining the integrator output signal and the proportional output signal to generate a signal for controlling the load.

13. The control system of claim 8 and further comprising:

a current feedback scaling circuit that adjusts a gain of the feedback signal.

14. A method for operating a controller used to control a load, the controller comprising an integrator component adapted to provide an integrator output signal for controlling the load, the method comprising:

conditioning the integrator component during a fraction of the period in which it would tend to otherwise wind-up wherein conditioning comprises reverse-charging the integrator component based upon a slew rate or an amplitude to a value less than the value required to maintain a steady-state level desired for the load.

15. The method of claim 14 wherein reverse-charging comprises:

receiving one of an input signal based on a command signal or a feedback signal;

differentiating said input signal;

combining said input signal with a signal based on the command signal; and providing the combined input signal and the signal based on the command signal to the integrator component.

16. A control system for controlling a load, the controller comprising:

an integrator component adapted to provide an integrator output signal used to control the load; and a component adapted to reverse-charge the integrator component to a value less than the value required to maintain a steady-state level desired for the load wherein the integrator component is reverse-charged based upon a slew rate.

17. A control system for controlling a load, the controller comprising:

an integrator component adapted to provide an integrator output signal used to control the load; and a component adapted to reverse-charge the integrator component to a value less than the value required to maintain a steady-state level desired for the load wherein the integrator component is reverse-charged based upon an amplitude.

* * * * *